United States Patent [19]

Civardi et al.

[11] 4,333,786
[45] Jun. 8, 1982

[54] LAMINATING

[75] Inventors: Frank P. Civardi, Wayne; Stanley G. Sova, Clifton; Milan J. Getting, Nutley, all of N.J.

[73] Assignee: Inmont Corporation, Clifton, N.J.

[21] Appl. No.: 125,002

[22] Filed: Feb. 27, 1980

Related U.S. Application Data

[63] Continuation-in-part of Ser. No. 19,235, Mar. 9, 1979, abandoned.

[51] Int. Cl.³ .............................................. B32B 1/00
[52] U.S. Cl. ........................... 156/306.6; 156/308.2; 156/309.6; 156/309.9; 156/324; 156/325.4; 428/296; 428/247; 428/316.6; 428/317.5
[58] Field of Search ............... 156/306, 320, 309, 322, 156/324, 311, 309.9, 324.4, 331, 313, 309.6, 308.2, 306.6; 428/904, 320, 296, 315

[56] References Cited

U.S. PATENT DOCUMENTS

| | | | |
|---|---|---|---|
| 3,410,748 | 11/1968 | Blue | 428/320 X |
| 3,533,866 | 10/1970 | Blue | 428/296 X |
| 3,600,250 | 8/1971 | Evans | 156/322 X |
| 3,647,594 | 3/1972 | Demme et al. | 428/904 X |
| 3,660,218 | 5/1972 | Shepperd et al. | 428/904 X |
| 3,666,598 | 5/1972 | Bauer | 156/324 |
| 3,717,528 | 2/1973 | Peerman et al. | 156/324.4 |
| 3,778,325 | 12/1973 | Ohara et al. | 156/324 X |
| 4,038,122 | 7/1977 | DeLigt | 156/205 X |
| 4,099,943 | 7/1978 | Fischman et al. | 156/309 |

Primary Examiner—David A. Simmons

[57] ABSTRACT

Process for laminating. A macroapertured thermoplastic web is brought continuously into contact with the hot moving surface of a rotating roll. A fabric is pressed against the thermoplastic material on the roll and, within about five seconds, the fabric carrying the hot thermoplastic material is continuously peeled off the roll. The resulting fabric, carrying hot thermoplastic material, is then brought into contact with a preformed cellular layer.

17 Claims, 9 Drawing Figures

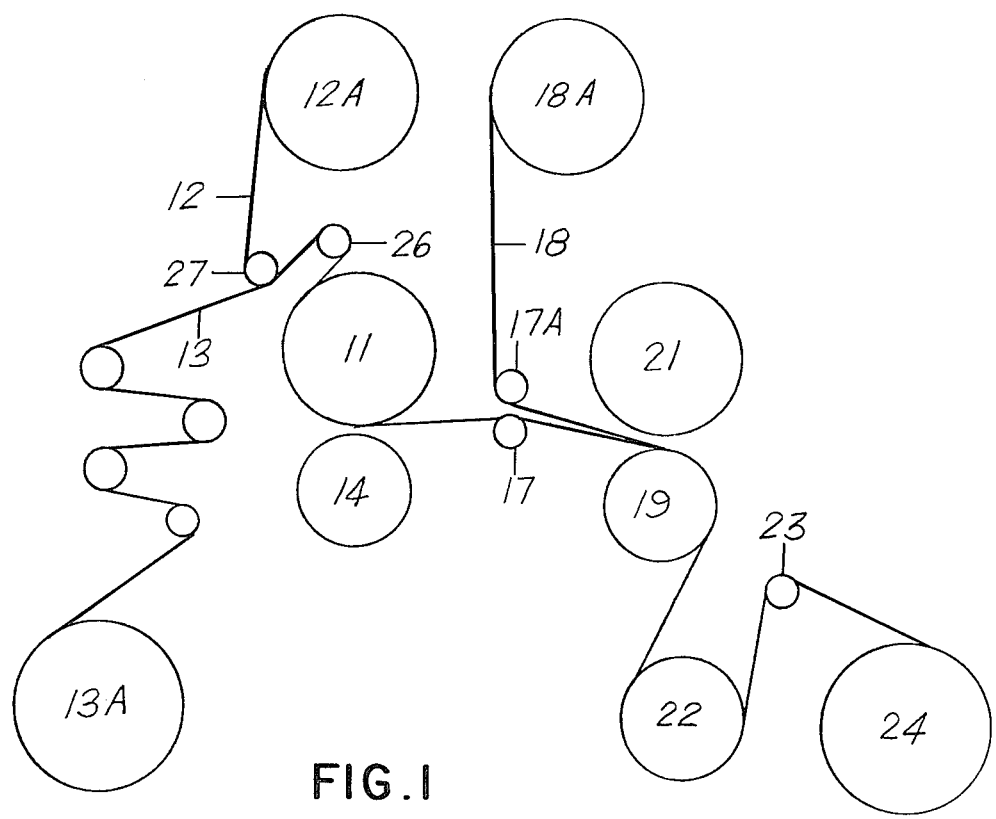
FIG. 1
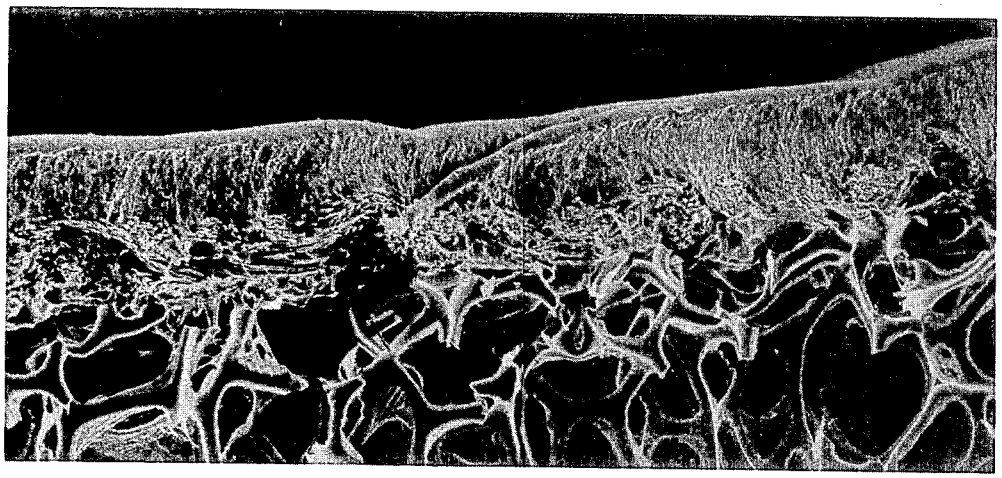
FIG. 8 |←400μ→|

FIG. 2
FIG. 3
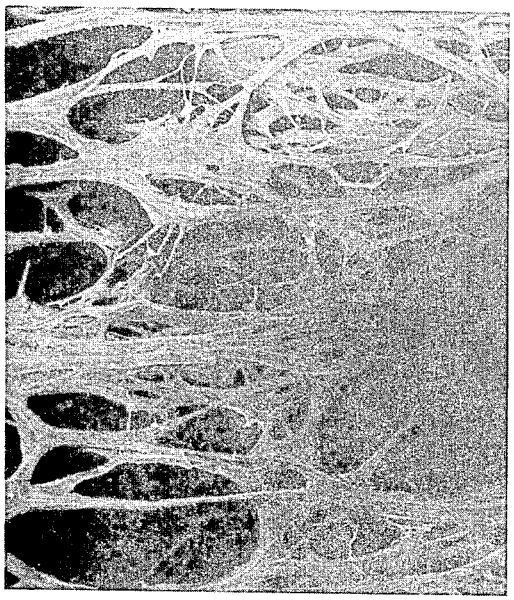
SCALE FOR FIGS 2 AND 3: |←1mm→|
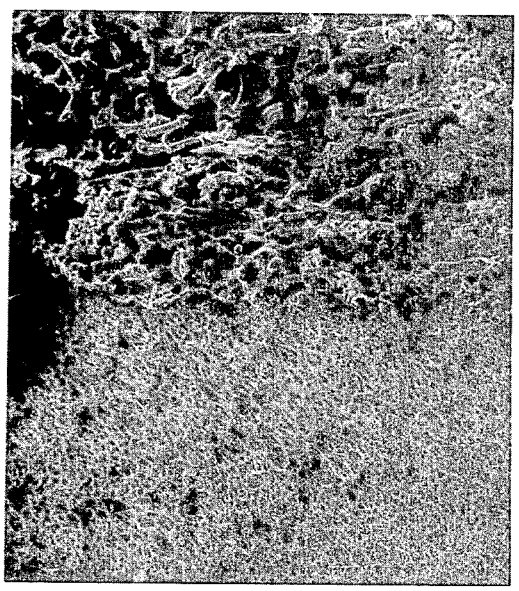
FIG. 4   →|100μ|←
FIG. 5   →|20μ|←

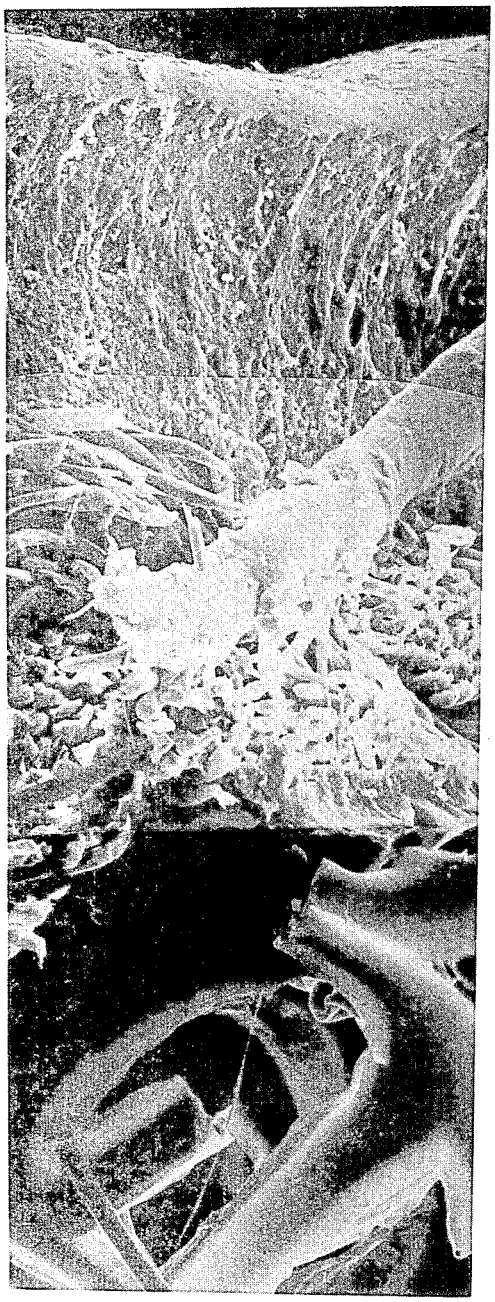
FIG. 9 |←100μ→|
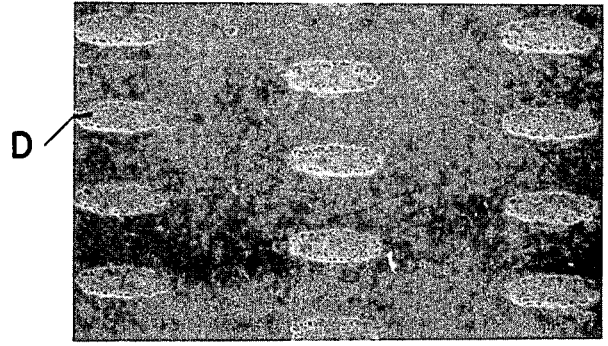
FIG. 6 →|200μ|←
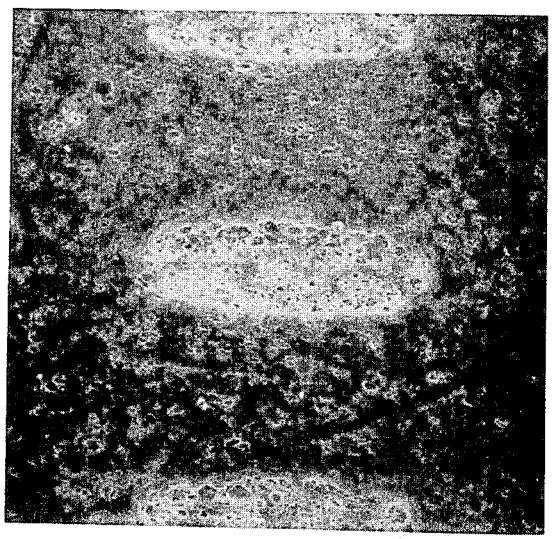
FIG. 7 →|100μ|←

LAMINATING

This application is a continuation-in-part of our application Ser. No. 019,235, filed Mar. 9, 1979, now abandoned whose entire disclosure is incorporated herein by reference.

This invention relates to a method for bonding a fibrous web to a preformed cellular polymer layer such as a layer of low density urethane foam or a layer of microporous polyurethane.

In accordance with one aspect of this invention, a macro-apertured web of thermoplastic material, is continuously brought into contact with the hot moving surface of a rotating roll and remains on that surface (substantially without relatively movement between roll surface and web) for a short period of time while the web is also in contact with the fabric, so that the fabric picks up a hot molten macro-apertured deposit of the thermoplastic material; the fabric carrying the molten deposit leaves the hot roll and is, while still in highly adhesive hot state, brought into contact with the cellular layer. It is found that the process can be carried out at high rates, such as speeds of over five meters per minute, yielding excellent adhesion and without damage to thermoplastic fabrics or thermoplastic layers thereon.

A particularly suitable macro-apertured thermoplastic web is a material having a lace-like random-patterned fibrous appearance. It is produced by a process of melt-extruding, in tubular form, an elastomeric polyurethane saturated with inert gas; the extruded material, containing spaced bubbles (formed by release of gas on extrusion), is then stretched to burst the bubbles and opposing walls of the tube are pressed together (while hot and self-adhesive) to form the tubular structure into a flat sheet. One such type of material is sold, under the name "Sharnet", as a heat-sealable adhesive. See U.S. Pat. No. 4,062,915.

Certain embodiments of the invention are illustrated in the accompanying drawings in which FIG. 1 is a schematic view of a laminating arrangement.

FIG. 2 is a plan view, taken with a scanning electron microscope (SEM) of a macroapertured web. (This view is taken at an angle of about 70° rather than 90°, to the face of the web; the same is true of FIG. 3).

FIG. 3 is a similar SEM plan view of another macro-apertured web, of higher density than that shown in FIG. 2. (The thin scroll formation, in this view is an artifact, possibly a stray fiber of another material).

FIG. 4 is a SEM cross-sectional view of a laminate of a fibrous layer and a microporous layer.

FIG. 5 is a SEM cross sectional view of a portion of the same laminate, at the interface between fibrous and microporous layers.

FIG. 6 is a SEM plan view of a face of the microporous layer.

FIG. 7 is a SEM plan view like FIG. 6 but at higher magnification.

FIG. 8 is a SEM cross-sectional view of a laminate of a vinyl coated woven fabric and a polyurethane foam having relatively large open cells; and FIG. 9 is a SEM view of a portion of FIG. 8, at higher magnification.

In the embodiment illustrated in FIG. 1 the arrangement comprises an internally heated driven roll 11 having a thin "non-stick" or adhesive surface, e.g. of polytetrafluoroethylene ("Teflon"). To the hot surface of that roll 11 there is fed a macro-apertured thermoplastic web 12, while one face of the web 12 is in contact with the hot roll surface and the opposite face of the web 12 is in contact with the fibrous surface of a fabric 13. The assemblage of web 12 and fabric 13 rests on the surface of the rotating hot roll and is moved, by contact therewith to a nip between an idler, nip roll 14 and the hot roll. At the nip the assemblage is subjected to a controlled pressure exerted (by hydraulic cylinder, not shown) to force the rubber-covered nip roll toward the surface of the hot roll. The contact between the surface of the nip roll 14 and the fabric causes the nip roll 14 to rotate at about the same linear surface speed as that of the hot roll.

Owing to the heat of the roll 11 the thermoplastic material of web 12 is melted thereon and tends to adhere to the surface of roll 11. On leaving the nip, molten material tends to stick to the fabric and is thus, to a large extent, peeled away from the hot surface of the roll 11 so that the hot side of the assemblage carries apertured deposits of the thermoplastic material in a hot-adhesive state.

More particularly, the pressure of the nip tends to force the hot highly viscous thermoplastic material into the interstices, and around the fibers of, the fabric whose temperature is lower than that of the surface of the hot roll, thus "bonding" the fabric to the thermoplastic material. As the material leaves the nip the path of the moving fabric diverges from the path of the hot roll surface and the moving fabric tends to peel the thermoplastic material off the hot roll surface. Under some conditions (as when the nip pressure and hot roll temperature are relatively high) this peeling action may remove substantially all the thermoplastic material from the surface of the hot roll; this may be due to the greater penetration of thermoplastic material into the fabric (owing in part to the higher nip pressure and in part to the lower viscosity resulting from the higher temperature) and to the lower adhesion of the hotter roll surface (e.g. because of the greater fluidity of the material at or very near that surface). Under other conditions (such as lower nip pressures) less of the thermoplastic material is forced into the fabric and the peeling effect may occur at a greater distance (still very small) from the surface of the hot roll, so that some of the thermoplastic material remains (e.g. in a raised apertured pattern) on the surface of the hot roll 11 and is thus carried around by the roll into contact with freshly supplied apertured web material. The temperatures and pressures which give substantially complete removal, or such partial removal, from the hot roll are readily determined, for a given hot roll surface, by simple experimentation with each particular thermoplastic apertured web and each particular fibrous web.

After leaving the nip the fabric carrying the hot deposits then passes over idler roller 17 while a continuous layer of polyurethane foam 18 is brought into contact (under an idler roll 17A) with the hot exposed deposits of thermoplastic material. The whole assemblage is passed directly into the nip between a driven roll 19 and a nip roll 21 which is pressed against the surface of the roll 19. Both rolls 19 and 21 are unheated. The foam becomes tightly bonded, by the thermoplastic deposits, to the fabric. The resulting laminate is then passed over idler rolls 22, 23 to a driven windup roll 24.

The three continuous webs (of macro-apertured thermoplastic 12, of fabric 13 and of foam 18) are fed to the device from suitably braked supply rolls (12A, 13A, 18A, respectively) so that they are kept under some tension in their passage through the apparatus. The apertured thermoplastic web 12 preferably is brought into contact with the fabric 13 before the web 12 comes into contact with the hot roll. In the illustrated embodiment the web 12 and fabric 13 pass between idler rolls 26, 27 with the web 12 outermost, so that the two webs tend to remain on contact (under the tensioning effect of the rotation of driven roll 11 on both web 12 and fabric 13) as they pass to the hot roll. The various webs are preferably fed in an unheated condition.

EXAMPLE 1

One type of fibrous fabric which may be used in the process is a vinyl coated fabric made up of a conventional layer of plasticized polyvinyl chloride on a relatively loosely constructed, relatively light weight fabric (such as woven or knitted fabric), the vinyl coated fabric having been given a relatively deep embossed pattern, as by heat embossing. This type of fabric is commonly used (with its embossed vinyl layer outermost, of course) for automobile seating. The process of laminating the vinyl coated fabric to the foam is carried out under such conditions (of temperature of the hot roll 11 and time of contact of the assemblage of webs 12 and 13 thereon) that there is no adverse effect whatever on the embossed pattern. FIGS. 8–9 show a cross-section of the resulting product.

As seen in FIGS. 8–9, the embossed vinyl coated fabric has a layer, whose thickness is in the neighborhood of 200 to 300 microns, of plasticized polyvinyl chloride on a woven fabric, comprising warp yarns (running transverse to the plane of the picture) and thicker filling yarns (running roughly parallel to the plane of the picture). The weaving pattern is a twill (3 up, one down) in which each filling yarn passes over one warp yarn and then under the next three warp yarns, so that the filling yarns are largely exposed at the uncoated face of the fabric. The weave is loose, there being about 25 warp yarns per cm and about 16 fil yarns per cm and the fabric weighs about 100 g/m² (4 oz/yd²). The yarns are each made up of a large number of fibers; the diameters of the fibers are, as seen in FIGS. 8 and 9, on the order of about 5 to 10 microns. The amount of coating is about 200 to 250 g/m² (about 8 to 10 oz/yd²) and the coating is deeply embossed in a pattern, its depressed portions being as much as 100 microns or more below the top of the undepressed portions. The melting point of the plasticized polyvinyl chloride is in the neighborhood of 190° C., which is about, or less than, the temperatures used in the laminating process.

As seen in FIGS. 8 and 9 the foam is of the open-cell type whose cells have diameters of well over 100 microns (particularly in the neighborhood of 300 microns) and whose specific gravity is well below 0.05 (particularly about 0.02 to 0.03 such as 0.025, i.e. 1.6 lb/ft³). In this Example the foam thickness is about 1.2 cm (½ inch). The foam is of conventional cross-linked elastomeric polyurethane; it does not melt at the temperatures used in the process.

The macroapertured web used in this Example 1 is made of thermoplastic elastomeric polyurethane having a melting point of about 110°–120° C. It weighs about 40 g/m² (1.6 oz/yd²); its thickness is about 200 microns (about 7 mils) and its configuration is as shown in FIG. 3. It is produced by the previously described melt-extrusion process.

The following conditions are used for the laminating:
Diameter of roll 11: 21 cm (8⅜ inches).
Surface temperature of roll 11: about 195° C.
Linear speed of surface of roll 11: about 5.5 m/min. (6 yds/min).
Extent of wrap of assemblage of 12 and 13 around roll 11: 120°.
Time of contact between assemblage and roll 11: 3 seconds.
Approximate pressure at nip between rolls 11 and 14: 1.6 kg per lineal cm (9 pounds per lineal inch).
Diameter of nip roll 14: 13 cm (5 inches)
Hardness of rubber surface of roll 14: 65 Shore A.
Linear speed of driven roll 19: about 5.7 m/min. (6.2 yds/min).
Diameter of driven roll 19: 30 cm (12 in).
Approximate pressure at nip between rolls 19 and 21: 13.6 kg per lineal cm (76 pounds per lineal inch).
Diameter of nip roll 21: 26 cm (10.25 inch).
Hardness of rubber surface of nip roll 21: 45 Shore A.
Distance travelled by assemblage from nip between rolls 11 and 14) until it first comes into contact with foam layer 18: 20 cm (8 inches).
Time travelled by assemblage from nip (between rolls 11 and 14) until it comes into contact with foam layer 18: 2.2 sec.
Distance and time travelled by assemblage from nip between rolls 11 and 14 to nip between rolls 19 and 21: 41 cm (16 inches) 4.1 seconds.

EXAMPLE 2

In this Example, the same equipment is used to bond a thin pre-formed foil or web of microporous polyurethane to a layer of fibrous fabric to produce a laminate illustrated in FIGS. 4 and 5, which is suitable as a shoe upper material. The microporous foil has a specific gravity of about 0.38, and a thickness of about 73 microns (29 mils) and is prepared by casting onto a belt a layer of a solution of elastomeric polyurethane containing dispersed microscopic salt particles (salt:polyurethane ratio about 3:1) as described for instance in British Pat. No. 1,222,804 and U.S. Pat. Nos. 3,860,680, 4,028,451 and patents referred to therein, and coagulating, leaching and drying that cast layer. One side of the foil (shown in FIGS. 6 and 7) has a pattern of depressions D about 12 microns (½ mil) deep, formed by the cured upper surfaces of wires or threads of the belt on which it is cast (see U.S. Pat. No. 3,860,680). The fibrous fabric is a non-woven structure having a thickness of about 50 mils (about 1¼ mm) and weighing about 350 g/m² (14.6 oz/yd²) sold under the name "Kroytan"; it is composed of leather fibers which have been bonded together by a suitable adhesive; as seen in FIG. 5, these fibers are about 10 microns thick. The macroapertured thermoplastic web is made (by the previously described melt-extrusion process) of elastomeric polyurethane having a melting point of about 120° C.; it has a thickness of over 3 mils (i.e., over about 0.08 mm) and less than 5 mils (about 0.13 mm), such as about 3.5-4 mils; and has a unit weight of over 10 g/m² (0.5 oz/yd²), and less than 20 g/m² (0.8 oz/yd²) such as about 13 to 16 g/m² (0.55 to 0.68 oz/yd²). This provides sufficient material, in sufficient local concentration, to effect closely spaced strong embedment of spaced outer fibers (of the fibrous fabric which is brought into contact with the hot thermoplastic material on the hot roll). The thermoplastic web (shown in FIG. 2) has substantially no apertures which are more than 19 mm across (preferably substantially none are above 7 mm across) in any direction. The speeds and times are the same as described in Example 1. The temperature of the surface of the hot roll 11 is about 195°–198° C.; the approximate pressure at the nip between rolls 11 and 14 is 1.25 Kg per lineal cm (7 pounds per lineal inch); and the approximate pressure at the nip between rolls 19 and 21 is 13.6 Kg per lineal cm (76 pounds per lineal inch).

The following Example illustrates the use of the invention to bond two fibrous fabrics.

EXAMPLE 3

In this Example, the process used in Example 1 is employed, with changes as noted below. The fabric 13 is a cotton drill fabric, a 2/1 twill weighing about 165 g/m$^2$ (about 4.9 oz.yd$^2$) having about 28 warp yarns per cm and about 16 fil yarns per cm., (a thread count, per inch, of about 70×40). In place of the foam 18 (FIG. 1), there is employed a cotton duck fabric (plain weave) weighing about 280 g/m$^2$ (about 8.2 oz/yd$^2$) having about 17 double warp yarns per cm and about 11 fil yarns per cm. (a thread count, per inch, of about 84×28). In each fabric the yarns are made up of a large number of fibers. The hot roll 11 is kept hot by internal circulation of oil whose temperature is maintained at about 400° F. (204° C.); the temperature of the smooth outer surface of roll 11 is within about 15° F. of that temperature. The extent of wrap of assemblage of 12 and 13 around roll 11 is 225° and the duration of contact between that assemblage and roll 11 is about 4.6 seconds. The approximate pressure at the nip between rolls 11 and 14 is about 6 pounds per lineal inch.

In this Example 3, rolls 17 and 17A (FIG. 1) are eliminated; the time for the assemblage to travel from the nip between rolls 11 and 14 to the nip between rolls 19 and 21 is about 4.5 seconds; the roll 21 is internally heated (with circulating oil at 400° F., like roll 11); the duck fabric is fed to roll 21 in such a manner that it wraps 255° around that hot roll (being in contact with it for 6.3 seconds) before engaging the assemblage (of 12 and 13) at the nip between rolls 19 and 21; and the approximate pressure at the latter nip is about 100 pounds per lineal inch.

In this Example several different macro-apertured webs, each weighing about 0.6 oz/yd$^2$ (22 g/m$^2$) are employed (in separate runs) as follows:

| | | Melting Point | Thickness |
|---|---|---|---|
| (a) | polyurethane | 145° C. | 5 mils |
| (b) | polyurethane | 120° C. | 4 mils |
| (c) | polyurethane | 115° C. | 4 mils |
| (d) | polyamide | 105° C. | 6 mils |
| (e) | ethylene-vinyl acetate copolymer | 115° C. | 7.5 mils |
| (f) | blend of ethylene-vinyl acetate copolymer and polyethylene | 122° C. | 10 mils |

Melting points are determined with a Fischer-Johns melting point block and are approximate; thicknesses, which are approximate, are determined with a Randall and Stickney thickness gauge at very low pressure so as not to deform the strands of polymer material.

The temperature of the surface of the hot roll 11 is desirably more than about 20° C. (and preferably more than about 40° C.) above the melting point of the polymer. In the foregoing Examples, it will be seen that the difference between the hot roll surface temperature and the melting point is at least about 50° C. (e.g. about 50° to 100° C.).

As indicated above, after the very beginning of a run (i.e. after the first turn of hot roll 11) the freshly supplied apertured web material being fed to the hot roll 11 will, under certain conditions, come into contact with a hot surface carrying a hot molten apertured pattern of thermoplastic material previously supplied thereto; the viscosity of the molten thermoplastic material (at the temperatures involved) is so high, and the surface tension forces are such, that the material does not spread out as a uniform non-apertured layer on the hot roll surface. It will be understood that it is also within the broader scope of the invention to "prime" the surface of the hot roll by applying thereto (while that roll is hot, or before it is heated) a layer of the apertured web and bringing the apertured web material to a molten or tacky apertured condition thereon and only thereafter starting to feed the fibrous web to the hot roll.

The macro-apertured web used in the foregoing specific descriptions is made by an extruding and stretching process. It has a plastic memory. When such a web is placed on a hot surface, it tends to shrink. Particularly when the temperature of the hot roll surface is such that the roll contacting portions of this web become molten and stuck to the hot surface, this shrinkage tendency causes the web to break up into individual spaced thicker lumps (e.g. due to localized shrinkage and breaking of unadhered or poorly adhered thinner portions connecting the contracting spaced adhered portions. For many purposes (as when the laminate is to be used as an artificial leather for making shoe uppers) this is less desirable in that the small bonding areas are not as close together as needed for optimum performance. One can restrain the lateral shrinking movements in the plane of the macro-apertured web by keeping it in contact with another, stable, web (such as the fibrous web) at the time that the macro-apertured web comes into contact with the hot surface; this (illustrated in FIG. 1) causes the whole open structure of that macro-apertured web to become anchored to the hot surface without substantial lateral shrinkage or break-up. Supporting the thermally unstable thermoplastic web by means of the stable web also insures that the unstable web does not break up in the air, owing to the heat of the roll, as it approaches the hot surface; this makes for easier feeding of the unstable web since the movement of the hot surface is thereby more surely transmitted to and through the unstable web to cause the latter to unwind from the feed roll.

It is within the broader scope of the invention to employ macro-apertured thermoplastic webs made of other thermoplastic polymers; these may be elastomeric at room temperature or they may, less desirably for some uses, be non-elastomeric or rigid at room temperature. The polymer is of high molecular weight (e.g. its intrinsic viscosity is above about 0.5, such as about 0.6 to 0.9, and it forms highly viscous melt, with little if any tendency to flow out, on the hot roll surface. For instance, it may be a nylon or other polyamide or a polyester or an olefinic polymer or copolymer (such as ethylene-vinyl acetate copolymer, high density polyethylene or polypropylene). Preferably it is of a material which forms a good bond to the polymer of the cellular layer; e.g. for bonding to a cellular polymer layer of polyurethane it is advantageous to use a thermoplastic polyurethane web, of lower melting point than that cellular layer.

When a polyamide is used, it may be a copolymer, or blend, having a plurality of different monomeric units, e.g. in which the unit lengths (between amide groups) are of various lengths (such as lengths of 6 and 12 carbon atoms in the same copolymer); for instance it may be a copolymer of caprolactam (nylon 6), hexamethylene diamine-sebacic acid amide (nylon 6,10) and hexamethylene diamine-dodecanedioic acid amide (nylon 6,12); see the article on "Copolymeric Nylon Powders for Fusing Textiles" by Schaaf in American Dyestuff Reporter, November 1972, pages 31, 34, 36 and 40, which describes materials of that type. Within the broader scope of the invention, one may use macro-apertured thermoplastic webs of the types disclosed in U.S. Pat. Nos. 3,885,074; 4,129,637; 3,483,581 or 3,502,763 or the web sold as "Delnet" (Hercules, Inc.). The macro-apertured polymer web preferably is at least about 0.07 mm in thickness and weighs about 10 or 20 to 100 grams per square meter.

As indicated in U.S. Pat. No. 4,062,915, to facilitate manufacture or handling of the macro-apertured polymer web, the web-forming polymer may be blended with one or more processing agents, which may be polymeric or monomeric.

The hot roll on whose outer surface the macro-apertured web is deposited is preferably internally heated. For instance, it may have a relatively thin outer wall (e.g. ¾ inch thick steel) and has provisions to insure that a heating fluid, such as oil, is circulated internally at a relatively rapid rate to maintain a relatively uniform temperature over the entire roll surface; typically the fluid circulates through a cylindrical annular space whose outer boundary is the annular cylindrical outer wall of the roll, and there is a vane (or vanes) to cause the fluid to flow in a spiral path along that wall. The outer surface of the thin outer wall preferably is of a release material, to which the thermoplastic material adheres poorly; thus the metal outer wall may have a thin outer coating of conventional non-stick solid polytetrafluoroethylene. However, tests with bare steel and aluminum surfaces indicate that the invention is operable without such an anti-stick surface.

As mentioned earlier, the fibrous web is pressed against the thermoplastic polymer on the hot surface so that portions of the thermoplastic polymer penetrate into the fibrous web and are molded at least partially around surface fibers thereof. This pressure is generally exerted by means of a nip roll such as roll 14. Particularly when the fibrous web is strong and tough (e.g. with the vinyl coated fabric) this pressure may be exerted, without a nip, simply by the tension on the fabric (around the hot roll) as it is pulled through the apparatus.

In the foregoing Examples the material leaving the hot roll is fed directly (usually within 3 seconds) into contact with the cellular polymer layer, while the thermoplastic polymer is still in hot adhesive condition. To prevent undesired cooling of the hot adhesive surface during this period, prior to contact with the cellular polymer, heat-maintaining or heating means may be provided, e.g., an infra-red heater, directed at the hot adhesive surface, between the hot roll and the point of contact with the cellular polymer layer. It is generally unnecessary, and even undesirable, to supply heat to the fibrous and cellular webs from other sources. It is, however, within the broader scope of the invention to pre-heat the surface of the cellular web and/or the surface of the fibrous web before such surfaces come into contact with the macro-apertured web; preferably in any such heating those web surfaces remain well below their melting temperatures, if any. It is also within the broader scope of the invention to cool, to a non-adhesive condition, the material leaving the hot roll and store it (preferably after rolling it up) for later use; in such later use its surface carrying the thermoplastic deposit may be passed under a heat source such as an infra-red heater (or even into contact with a heating surface (e.g. of a hot roll, whose surface is moving at the same speed as the material being heated) or a flame) to re-activate the adhesive, and then passed into contact with the cellular web.

The fibrous web may, as previously indicated, be woven, knitted or non-woven (e.g. felted, needle-punched, etc.). It may be made of various fibers or combinations of fibers, such as cotton, rayon, nylon, polyester (e.g. polyethylene terephthalate), acrylic, triacetate, wool, leather or other protein, etc. As illustrated, coated fabrics may be employed, such as those carrying vinyl or elastomeric polyurethane coatings; such coatings may be wholly or partially cellular, with open or closed cells. A description of such coated fabrics is found for instance in the article on "Fabrics, Coated" in Encyclopedia of Chemical Technology, 2nd Ed., Vol. 6.

The cellular layer is preferably of elastomeric or flexible polyurethane. Other cellular polymer materials, well known in the art, may also be used. See, for instance the chapter on "Plastic and Elastomeric Foams" at pages 7-1 to 7-79 of "Handbook of Plastics and Elastomers" edited by Charles A. Harper, pub. 1975 by McGraw-Hill Book Co.; see also "Plastic Foams" by C. J. Benning, pub. 1969 by Wiley-Interscience.

The laminates may be suitably embossed or otherwise shaped and the presence of the thermoplastic material present at the interface between the fibrous fabric and the cellular layer may be utilized to aid in such shaping. Thus, the foam-fabric laminate may be treated to effect a permanent densification of the foam locally. For instance, in the use of the material for upholstering automobile seats such local densification, along predetermined lines or bands, is employed to aid in converting the sheet laminate to a stable three-dimensional shape conforming to the shape of, say, the seat portion or the back rest portion of the automobile seat. In one method of doing this, the laminate is compressed (bringing new portions of the foam into contact with the thermoplastic adhesive) and heated dielectrically at the zone of compression to bring the thermoplastic adhesive in that zone to a molten or tacky condition, and then allowed to cool in compressed state so that said "new portions" remain permanently bonded by the adhesive adjacent to the fibrous layer. For this purpose it is generally desirable that the amount of apertured thermoplastic material be greater than that needed for merely bonding the foam to the fabric; to insure this, a thicker apertured thermoplastic web may be used, such as the 1.6 oz/yd$^2$ web described above.

As illustrated in Example 2, the process is very suitable for laminating fibrous webs to microporous layers to make a laminate which is very useful for shoe-upper material. Further details of suitable constructions, uses and finishing and other after-treatment of such laminates (including the nature of the fibrous substrate and microporous layer) are found in the application of Civardi, Sova and Burachinsky Ser. No. 891,833 filed Mar. 30, 1978 whose entire disclosure is hereby incorporated by reference.

The cellular polymer layer will generally be at least about 0.2 mm thick and weigh at least about 70 grams per square meter (about 3 ounces per square yard).

The process makes it possible to effect lamination at very high rates while obtaining excellent bonds (e.g. bonds which "fail", on attempted stripping, by rupture of the cellular, or fibrous layers, not at the bond itself). As indicated rates of over 5 meters per minute have been attained; in that case the rate was determined only by the speed of the existing equipment and no reason is seen why the rate should not be as high as 10, 15, 20 or 30 meters per minute, or more.

In a less desirable process, within the broader scope of the invention, the web feed is reversed in that the macro-apertured thermoplastic web is pressed against the hot roll by the cellular (non-fibrous) web and the resulting adhesive-surfaced cellular web is brought into contact with the fibrous fabric. It is also within the broader scope of the invention to substitute a second fibrous web for the cellular polymer web; both fibrous webs may be woven, knitted or non-woven and their fibers may be continuous filaments or staple fibers. Usually such staple fibers are well over 1 cm. long (such as 2 to 4 or more cm. long) so that the exposed portion of an individual fiber which comes into contact with the molten material is usually only a minor fraction of the length of that fiber. The rest of its length (including one or, usually, both its ends) is unexposed, and out of contact with the molten material; for instance it may (in a woven or knitted fabric) be buried or anchored within, or on, an undulating twisted multifilament yarn (see FIGS. 8 and 9) or (in a non-woven fabric) buried and bonded in the interior portions of the fabric.

The macro-apertured web may be a single-ply material, as in the Examples, or it may be a multi-ply web (e.g., composed of two individual webs, each 6 mils thick, arranged face to face).

In Example 1 above the surface of the hot roll is at a temperature which is at or above the melting temperature of the embossed vinyl coating. Nevertheless the vinyl coating is substantially unaffected by the treatment and retains its embossed design. Apparently there is a significant thermal gradient across the thin gap (whose thickness is on the order of 0.2 mm; see FIG. 8) which extends from the hot roll (or hot thermoplastic) surface. This is due, at least in part, to the relatively short time during which the vinyl-coated fabric is wrapped around the hot roll. Also, the temperature of the vinyl coating of the material being fed to the hot roll is preferably relatively low (e.g. about room temperature) so that the hot thermoplastic material which has been forced into contact with outer fibers of the fabric tends to be cooled and set thereby. The contact of the exposed hot thermoplastic material with the cellular (or other) web brought into contact therewith after the material leaves the hot roll will also have a cooling and setting effect.

In the preferred forms of the invention the weight of the macro-apertured web is in the range of about 10 to 50 grams per square meter. For making shoe upper materials it preferably weighs less than 20 grams per square meter and the microporous web has a specific gravity within the range of about 0.2 to 0.4.

It is understood that the foregoing detailed description is given merely by way of illustration and that variations may be made therein without departing from the spirit of the invention.

We claim:

1. Process for making a laminate which comprises:
    (a) continuously feeding a macro-apertured solid web of thermoplastic polymer into contact with a hot moving surface of a continuously rotating roll, the temperature of said hot surface being above the melting temperature of said polymer, said macro-apertured polymer web having a thickness of at least about 0.07 mm and weighing about 10 to 100 grams per square meter, the polymer portions of the web thickness which are in contact with said hot surface becoming molten and adhering to said hot surface while the polymer portions of the web thickness which are more remote from said hot surface become at least softened,
    (b) continuously feeding a fibrous web to said roll so that said fibrous web is in contact with said polymer on said hot surface,
    (c) maintaining said thermoplastic polymer in macro-apertured condition on said surface substantially without relative movement between surface and said polymer,
    (d) during said period pressing said fibrous web against said thermoplastic polymer on said hot surface to such an extent that portions of said thermoplastic polymer adjacent to said porous web penetrate into said fibrous web and are molded around surface fibers thereof while molten portions of said thermoplastic polymer remain exposed at the surface of said fibrous web and then
    (e) within 5 seconds of said contact in step a, continuously peeling said fibrous web away from said hot roll surface so that said fibrous web removes, from said hot roll surface, said molded portions of said thermoplastic polymer and at least part of said molten exposed portions.

2. Process as in claim 1 in which said macro-apertured web is of thermoplastic elastomeric polyurethane.

3. Process as in claim 1 in which the weight of said macro-apertured web is in the range of about 10 to 50 grams per square meter.

4. Process as in claim 1 and including the step of (f) continuously feeding a solid cellular elastomer web to bring a solid unmolten face thereof into bonding contact with said molten exposed portions, said cellular web being at least about 0.2 mm thick and weighing at least about 70 grams per square meter.

5. Process as in claim 4 in which said cellular elastomer web is of microporous polyurethane having a specific gravity of less than 0.4.

6. Process as in claim 5 in which said specific gravity is greater than 0.2.

7. Process as in claim 4 in which said cellular elastomer web has a specific gravity below 0.05 and comprises cells which are over 100 microns in diameter.

8. Process as in claim 7 in which said cellular web is polyurethane foam.

9. Process as in claim 1 in which the melting temperature of said thermoplastic polymer is above 100° C.

10. Process as in claim 1 in which said macro-apertured web, when it comes into contact with said hot surface, is also in contact with said fibrous web to such an extent that the open structure of said macro-apertured web becomes anchored to said hot surface without substantial lateral shrinkage or break-up.

11. Process as in claim 10 in which said macro-apertured web is supported by said fibrous web as it travels to said hot surface.

12. Process as in claim 8 in which said fibrous web comprises a knitted fabric, one face of which is in contact with said thermoplastic polymer on said hot surface.

13. Process as in claim 8 in which said fibrous web comprises a woven fabric, one face of which is in contact with said thermoplastic polymer on said hot surface.

14. Process as in claim 13 in which the opposite face of said fibrous web carries a layer of plasticized polyvinyl chloride.

15. Process as in claim 14 in which said polyvinyl chloride layer is an embossed layer.

16. Process as in claim 1 in which said fibrous web is a fabric of interlaced yarns of a plurality of fibers, said fibers being more than 1 cm. long.

17. Process as in claim 16 and including the step (f) of continuously feeding a second fibrous fabric of interlaced multi-fiber yarns to bring a solid unmolten face of said second fabric into bonding contact with said molten exposed portions, the fibers of said second fabric being more than 1 cm. long.

* * * * *